US012704345B2

(12) United States Patent
Nau et al.

(10) Patent No.: US 12,704,345 B2
(45) Date of Patent: Aug. 11, 2026

(54) COMBAT TRAINING SYSTEM

(71) Applicant: Fraunhofer-Gesellschaft zur Förderung der angewandten Forschung e.V., Munich (DE)

(72) Inventors: Siegfried Nau, Freiburg (DE); Sebastian Heß, Freiburg (DE); Eckhard Kuschke, Koblenz (DE); Sven Nothdurft, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 612 days.

(21) Appl. No.: 18/044,107

(22) PCT Filed: Sep. 23, 2021

(86) PCT No.: PCT/EP2021/076223
§ 371 (c)(1),
(2) Date: Mar. 6, 2023

(87) PCT Pub. No.: WO2022/063909
PCT Pub. Date: Mar. 31, 2022

(65) Prior Publication Data

US 2023/0366649 A1 Nov. 16, 2023

(30) Foreign Application Priority Data

Sep. 24, 2020 (EP) .................................... 20198191

(51) Int. Cl.
*F41A 33/00* (2006.01)
*F41A 17/08* (2006.01)
*G09B 9/00* (2006.01)

(52) U.S. Cl.
CPC .............. *F41A 33/00* (2013.01); *F41A 17/08* (2013.01); *G09B 9/003* (2013.01); *G09B 9/006* (2013.01)

(58) Field of Classification Search
CPC .......... F41A 33/00; F41A 17/08; F41A 33/02; F41A 33/04; F41A 33/06; G09B 9/003; G09B 9/006
See application file for complete search history.

(56) References Cited

U.S. PATENT DOCUMENTS

| | | | | |
|---|---|---|---|---|
| 2007/0190495 | A1* | 8/2007 | Kendir | F41A 33/02 434/21 |
| 2011/0311949 | A1* | 12/2011 | Preston | F41G 3/2655 434/16 |
| 2013/0260342 | A1* | 10/2013 | Stanley | F41G 3/2655 434/16 |

FOREIGN PATENT DOCUMENTS

| | | | |
|---|---|---|---|
| EP | 2950032 | A1 | 12/2015 |
| WO | 2011037661 | A2 | 3/2011 |

(Continued)

OTHER PUBLICATIONS

International Search Report for PCT/EP2021/076223 dated Dec. 8, 2021, 11 pages.

*Primary Examiner* — Timothy A Musselman
(74) *Attorney, Agent, or Firm* — FITCH, EVEN, TABIN & FLANNERY, LLP

(57) ABSTRACT

A combat training system for carrying out and monitoring at least one shooting practice and combat scenarios, comprising: at least two components, with a first component being a firearm and a second component being a target object; a device for sensing position information of each of the at least two components; device for sensing spatial orientation information at least for the at least one firearm of the at least two components; and an information processor, in which posi- (Continued)

tion information of the at least two components and the orientation information of the at least one firearm is processed and transformed into at least result information. The at least two components each have a clock, which are time-synchronized with each other and each generate coded time signals with a component identifier which individualizes the respective component, and an event sensor is provided on each of the at least two components.

19 Claims, 12 Drawing Sheets

(56) References Cited

FOREIGN PATENT DOCUMENTS

| | | | |
|---|---|---|---|
| WO | 2013160445 | A1 | 10/2013 |
| WO | 2017184230 | A2 | 10/2017 |

* cited by examiner

COMBAT TRAINING SYSTEM

CROSS-REFERENCE TO RELATED APPLICATIONS

Reference is made to International Application No. PCT/EP2021/076223, filed Sep. 23, 2021, which claims priority to European Patent Application No. 20 198 191.7, filed Sep. 24, 2020, the contents of which are incorporated herein by reference in their entirety.

BACKGROUND OF THE INVENTION

Field of the Invention

The invention relates to a combat training system for conducting at least one of shooting practice and combat scenarios in a monitored manner.

Description of the Prior Art

Conducting shooting practice on civilian or military firing range facilities and also executing combat scenarios on military training areas are governed by strict safety standards, the primary purpose of which is minimizing the risk of injury for all individuals involved directly or indirectly in the shooting practice and preventing as far as possible any material damage to objects in the surrounding area. In order to guarantee shooting safety when handling firearms on military training areas, designated danger zones are defined, and the individual shooters are also monitored and controlled by supervisory personnel. However, the establishment of permanent danger zones in fixed locations or provided for a specific exercise in training areas significantly limits training options. Moreover, monitoring of shooting practice on training areas and also at firing range facilities by supervisory personnel is extremely complex and is still unable to afford complete coverage for reasons associated with the system.

For example, if a combat exercise is to be conducted on a training area with service ammunition, first the envisaged course of the exercise is developed based on a training objective. An important part of this is the determination of static hazard and safety zones. This is most often done using analog methods and always in advance on the basis of the Shooting Safety Central Regulation A2 2090.

Laser-based systems which can be mounted individually on a firearm as an add-on module for hit detection and control are known. Laser pointer systems of such kind enable both optical and sensory perception of target hits, particularly when maneuver ammunition, i.e. blank ammunition, is used.

When training with live ammunition, at least during very simple shooting practice, accuracy is assessed by visual observation of the shooter and the target. In cases of more complex exercises, such as combat exercises, such optical monitoring of the hit assignment is very difficult, or impossible.

A very similar technology for using laser pointer systems in conjunction with firearms is described in Document EP 2 950 032 B1. That document discloses an apparatus and a method for improving the hit probability of a firearm, wherein a detection unit is contained in the firearm for collecting direction data, by which the direction and orientation of the firearm can be detected. Based on the firearm direction data obtained in this way, shot release is enabled or prevented by a firing processor which accounts for predefined permitted firing zones with the aid of an electromagnet which controls the function of the sear.

WO 2017/184230 A2 discloses an electronic firearm system for portable firearms, equipped with acceleration sensors and a control system which calculates the location and orientation of the firearm relative to a combat area. The data calculated in this way is forwarded to a user's heads-up display and to a group and area network. Through the visual display of the data, the user is able to represent, virtually, the flight path, the point of impact and other ballistic data relating to the condition and performance of the weapon for all rounds fired.

WO 2013/160445 A1 describes a method for the three-dimensional capture of scenario events in training exercises for close-range firefights, in which multiple imaging systems such as video cameras, scanners or the like are installed to monitor the training areas, and a software program calculates and records a photo-realistic 3D-model of the scenario from all of the images generated.

SUMMARY OF THE INVENTION

The problem addressed by the invention is to suggest a combat training system for conducting at least one of shooting practice and combat scenarios in a monitored manner, in such a way that it should be possible to capture and preferably oversee all firearms used in a shooting exercise or combat training scenario, i.e., guns in the general sense and in particular handguns, without thereby impeding the handling and also mobility in the use of the respective firearm. This applies particularly when a large number of firearms are deployed in a combat scenario, in which the personnel who are training should be largely unrestricted as to mobility and must be able to move over the terrain with the least possible or no restrictions in terms of danger zones. Optionally, it should further be possible to exercise a supervisory influence on the manner of operation of individual firearms. Regardless of whether live or maneuver ammunition, i.e. blanks, are used, it should be possible to capture and review the individual firearms, and also the firearm-specific hit events.

The solution to the problem addressed by the invention may be discerned particularly with reference to the explanations of the embodiments.

The combat training system enables at least one shooting practice and combat scenarios to be conducted in a monitored manner which comprises at least two components, of which the first component is a firearm and the second component is a target object or a firearm.

The term "firearm" is understood to embrace guns in general, which have a barrel or weapon barrel, from which projectiles or shots are fired, which follow a purely ballistic flight path after exiting the barrel. In this context, this refers especially to combat vehicle-mounted weapons, mainly in the form of tank guns, but in particular also to handguns that can be carried by individuals. Guns are characterized primarily in that the ballistic shot trajectory of the projectile is determined by the longitudinal extension of their associated barrel at the time the shot is fired.

The combat training system further comprises a device for sensing an item of position information for the at least one firearm and also for the at least one target object. The term "position information" is understood to mean a precise indication of location relative to any predefinable coordinate system, preferably based on the geographical coordinate system in which a geographical position is determined by specification of the geographical longitude and latitude.

Further, a device for capturing the spatial orientation at least of the at least one firearm from the at least two components is provided, which is capable of generating an item of spatial orientation information. In this context, the device captures the spatial orientation of the longitudinal extension of the barrel, preferably in the form of a three-dimensional vector relative to the respective predefined coordinate system. In the case of a target object that is not stationary and unmoving, but mobile, the spatial orientation of the target object relates for example to the orientation of a preferred impact area.

The device for sensing the position and spatial orientation information for the at least one firearm and the device for sensing the position information for the at least one target object are designed and arranged as separate, preferably as integral elements in the at least two components or may be embodies in the form of a single, separate sensing system.

The device or devices are capable of transmitting the position information of all components and the orientation information items at least for all firearms among the components to a central information processing unit, where the position and orientation information elements of the detected components may be processed and transformed at least into the form of a result information element. The result information is used primarily for further evaluation and at least one archiving and representation for purposes of monitoring and supervising the current combat scenario.

In order to guarantee that all events, relating to both the at least one firearm, for example a fired round, and to the at least one target object, for example an impact on a target object, can be assigned flawlessly to the respective component, i.e. the firearm or the target object, each of the at least two components is equipped with a clock, wherein the clocks are time-synchronised with each other, and each generates coded time signals with a component identifier that individualises the respective component. Further, an event sensor is mounted on each of the at least two components, with which in the case of the firearm at least at least one firing event and in the case of the target object impact, the event may be detected by a sensor. For each of the events detectable by sensing means, an event time signal providing a kind of timestamp resolved according to time is generated within the framework of the common system time, which is imposed on all components by the temporal synchronism between the clocks. Thus, when a round is fired, the coded event time signal is transmitted together with the respective position and orientation information for the respective firearm to the information processing unit for further analysis. In the same way, when an impact event occurs on the target object, a corresponding hit- and target object-specific, time-coded event signal is generated and is transmitted to the information processing unit for further analysis in the same way.

The combat training system according to the invention serves to improve safety and training success when conducting firearms exercises, with which all risk-relevant components involved in the combat scenario are captured and at least one of the monitored and supervised with location and time resolution, which is based on a unified spatial coordinate system and a unified system time.

In a preferred embodiment, at least the at least one firearm and optionally the at least one, preferably mobile target object is equipped with a device for sensing the position information as an integral element of the firearm and the target object. Especially suitable for this is a unit for receiving and evaluating satellite-supported position signals, preferably for receiving at least one GPS, GLONASS, GALILLEO and BEIDOU signals. Alternatively, particularly when conducting indoor combat exercises, it is conceivable to establish a world coordinate system defined by space markers or similar reference objects, and for which the position and the spatial alignment and orientation of the respective components may be captured.

In the same way, the device for sensing the spatial orientation information of the at least one firearm and optionally of the at least one target object is designed as an integral element of the respective component. Sensor components of the following kind are highly suitable for sensing the alignment and spatial orientation of at least one firearms and target objects: Inertial Measurement Unit (IMU), preferably with fixed reference to the firing direction and absolutely georeferenced or externally relative referenced to an absolute, georeferenced system; magnetometer; camera, preferably with automated image analysis for target or object detection; optical sensor, for example for sensing brightness, polarization for direction detection; ultrasonic transducer or ultra-wideband (UWB) sensor arrangement, motion analysis sensor (Motion Capture).

In order to transmit at least the respective captured position and orientation information to the central information processing unit, the at least one of a firearm and the at least one target object is/are additionally equipped with a unit which processes the information captured by the sensors, preferably in the form of a microprocessor-based arithmetic unit, and a communications unit connected directly or indirectly thereto, via which the information captured by a sensor may be transmitted to the information processing unit.

The communications units provided on both the firearm side and the target object side are preferably designed as a transmitter-receiver units. This makes it possible for multiple firearms to communicate not only among themselves but also with the target objects. In this way, it is then possible to establish a distributed communication system between the firearms and the target objects, which is capable of supporting realtime communication, on the basis of short-range wireless technology, for example.

As a alternative to a sensor arrangement integrated in the firearms and target objects for sensing the position information and spatial orientation information, or in combination with such a sensor arrangement, it is a reasonable development to design the device for at least one of sensing the position information and the device for sensing the spatial orientation information as a separate terrestrial-, at least one of a water- and an airborne remote control system. Using remote control technology, at least for sensing the position and spatial orientation of at least the firearms, in principle it is not necessary to make any modifications to the components, i.e. at least one of the firearms and the target objects.

The following systems are suitable for use as remote control systems: radar system and/or optical image and pattern detection system, sound wave or ultrasound wave based, range-resolving detection system (SODAR or UWB), and lightwave-based range-resolving detection system according to the LIDAR principle.

Hits on target objects may also be detected using acoustic, structure-borne sound, or RADAR sensors.

The remote control system that is to be set up on, at least one of around and above the exercise area includes a data capture and data transmission unit with realtime capability, which is in communication with the central information processing unit.

Wireless technologies such as WLAN, Bluetooth, LTE etc., and wired technologies, e.g., RS-232, Ethernet or USB are suitable for use as realtime-capable data transmission systems with sufficiently large bandwidth.

But even in the case of decentralized sensing of position and alignment or orientation of the at least one firearm among the at least two components, it is necessary to assure at least a time-synchronous information capture at least of the position and alignment of all relevant components involved in the exercise. For this purpose, a precise, that is to say with time precision in at least the millisecond range, unified, synchronous time basis is needed for all components, in order to sense their positions and alignments in a temporally correlated way. This temporal correlation may be attained by implementing high precision, individually temporally synchronized clocks, of which one clock is integrated in each of the components concerned. Alternatively or in combination therewith, the common time basis may also be obtained from reception of the time signal component of a GNSS, that is a satellite navigation signal.

In order to also be able to evaluate all of the information transmitted to the information processing unit selectively according to components, and finally to represent them distinctly from each other, each component has the capability to supply or generate and send preferably one identification number in each case uniquely individualizing the respective component when transmitting at least the position and orientation information.

A further embodiment provides that at least one firearm has a unit for sensing the arm state and generating an information element about the arm state of the firearm. In particular, the sensing unit is capable of unerringly detecting the fire readiness state of the firearm, in which the firearm is able to fire at least one shot by actuation of the trigger. In this way, the arm state of the weapon may additionally be communicated to the central information processing unit, where a total situational picture of the firing exercise or the combat scenario can be created incorporating all firearms in realtime, simultaneously with the transmission of position and orientation information.

In a further embodiment, in addition the units described earlier for sensing position, spatial orientation and even the arm state of the firearm, the at least one firearm also provides a remotely activatable firearm disabling device, with which it is possible to impose a weapons deactivation of individual firearms remotely by the central information processing unit or a higher-level control unit in communication therewith. In the case of handguns, this firearm disabling device may be implemented for example by integration in a separate training grip.

In order to be able to capture the firing and also an impact event at the site of a target object accurately, the at least one firearm and the at least one target object provide an event sensor, which may be embodied in many variations in the form of one of the following sensors: an accelerometer, an acoustic sensor, e.g., a microphone, a structure-borne sound sensor, a deformation sensor, a contact sensor, a motion analysis sensor, e.g., a firing pin movement on the firearm.

In order the capture the events of both the shot from the firearm and the impact of a projectile or shell on the target object or a near miss of the target by a projectile or shell accompanied by a shock wave with exact timing, the firearm and the at least one target object are each equipped with a clock, and these are time-synchronized with each other and are able to a generate time signals, each of which is coded with a component identifier that individualizes the respective firearm and the respective target object. In this way, it is possible to assign target object impact events to specific firearms, and also to archive the firing history of each individual firearm with associated hit rate for purposes of subsequent analysis.

It is not necessarily essential for the at least one target object to be made or supplied in the form of a real object. Rather, it is possible to present a target object to the respective shooter virtually, so that they are optically perceptible, for example using VR glasses, 3D projection systems, e.g. in the form of a hologram or fog projection images etc. Since the target object projection is generated by digital resources, the position and alignment of the respective target object relative to the training participant are available as information that is already inherently known in the system, and can be processed in the information processing unit together with the information collected by the sensor arrangement of the respective firearm.

BRIEF DESCRIPTION OF THE DRAWINGS

In the following text, the invention will be described for exemplary purposes without limitation of the general inventive thought, based on embodiments thereof and with reference to the drawing. In the drawing.

DETAILED DESCRIPTION OF THE INVENTION

Figure 1:
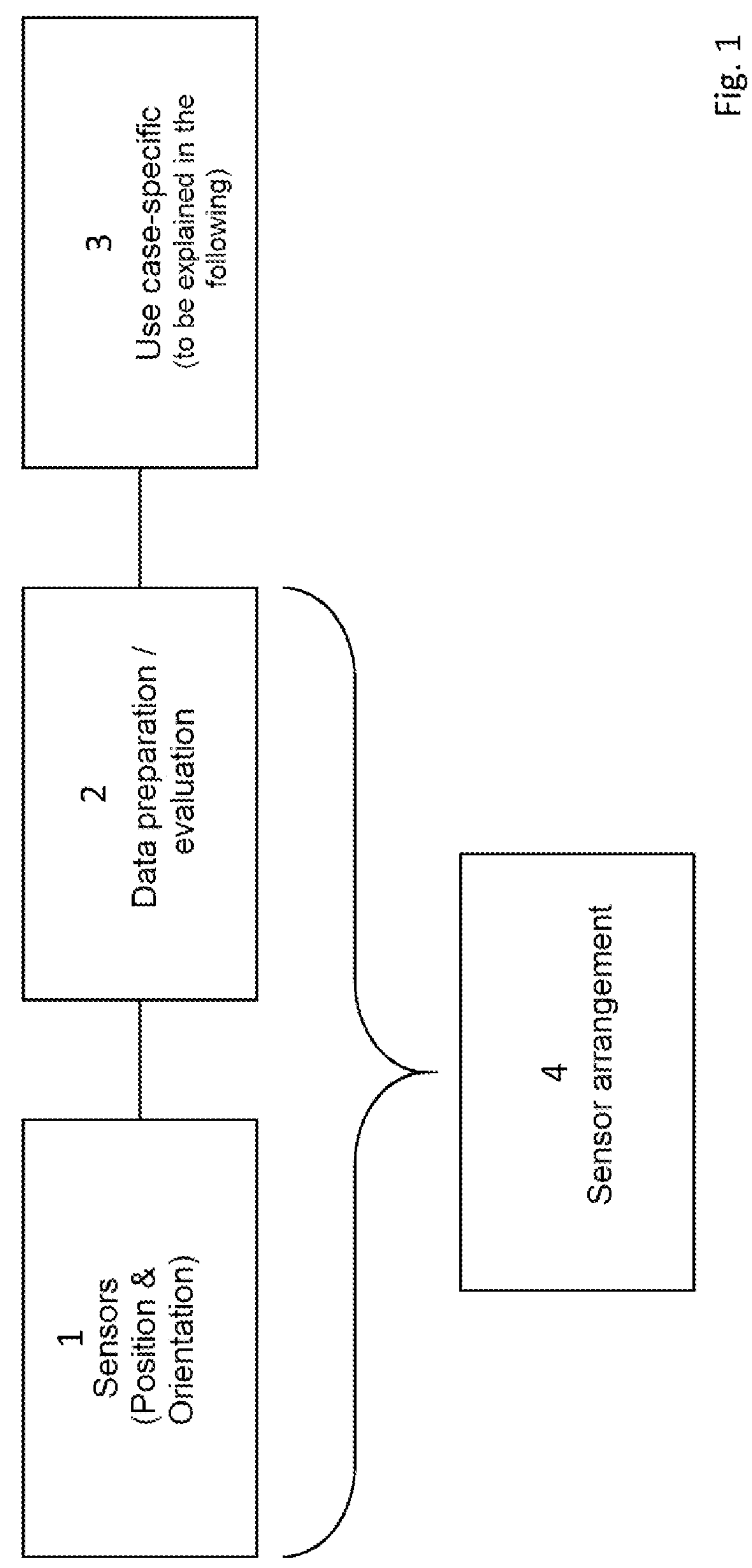
FIG. 1 shows the basic structure of a combat training system designed according to the invention.

The heart of the combat training system according to the invention is a sensor arrangement, with which it is possible to detect events such as the firing of a shot, and the position as well as the spatial alignment and orientation of at least one firearm participating in the combat scenario, and to transmit the firearm-specific event, position and orientation information to a central information processing unit for further evaluation, preparation and display of the information.

A description of the sensors and other components needed for this will be explained in the following text with reference to various use cases. These relate specifically to:

a. Detecting and displaying the overall situation, i.e. position and orientation of all firearms and optionally target objects or target representing devices present in the combat scenario; and detecting and displaying the danger zones due to fire ready firearms b. Calculating flexible danger zones c. Blocking firearms in certain situations d. Detecting simulated hits on target objects e. Firearm-specific assignment of hits f. Combating virtual target objects One option for position and attitude sensing of a firearm is the integration of a sensor arrangement that is preferably modular in design and can be integrated in the firearm. If the firearm is a handheld weapon, e.g. a pistol or rifle, the capability exists to integrate the sensor arrangement inside the replaceable grip of the firearm. This enables flexible and mobile use, and the shooters can continue using their own weapon for the training without limitations.

The sensor arrangement preferably comprises a number of components of the following kind: unit for receiving and evaluating satellite-supported position signals, such as for example GPS, GLONASS, GALLILEO, BEIDOU signals, Inertial Measurement Unit (IMU), magnetometer, integrated camera, for example with automatic image analysis for target detection, optical sensors, e.g., brightness sensor, polarization sensor for direction detection, ultrasonic range sensors ultra-wideband (UWB) position sensor, and motion capture, i.e. motion analysis sensor.

Besides these sensors, the sensor arrangement also comprises the components necessary for operating the sensors, such as a firing processor-based signal capture and signal processing logic, an energy supply unit and a communications unit for transmitting the information captured by the sensors, that is at least the position and orientation information, to a central information processing unit.

Additionally, a part of each sensor arrangement is a clock, which sets a system time at the location of the sensor arrangement, wherein each clock, and therewith the system times of all sensor arrangements in all of the components involved in the firing exercise, that is all firearms and target objects, are time-synchronized. Moreover, the clocks are capable of generating time-synchronized, coded time signals, by which each individual component is identifiable in component-specific manner. For this purpose, the coding provides a component identifier that individualizes the respective component.

Besides the sensor arrangement which captures position and attitude information for the respective component, as explained previously the at least one firearm and the at least one target object are each equipped with an event sensor, which in the case of the firearm is able to sense a firing event, and in the case of the target objects is able to sense an impact event. At least one of the following sensors is preferably suitable for this purpose: accelerometer, acoustic sensor, structure-borne sound sensor, deformation sensor, and contact sensor.

Thus in each case the event sensor is able to trigger the clock arranged in the corresponding component to generate a coded time signal, thereby adding a temporally precise timestamp to the detected event (firing event or impact event) and supply it to the information processing unit together with the information about the location and alignment of the firearm or the target object for analysis.

Through the temporal correlation between firing and impact event, an exact shooter-target assignment can be made as part of the information analysis procedure. Moreover, the ability to capture events and forward the information associated therewith to the information processing unit in realtime offers the capability of dynamic situation and threat assessment in situ, i.e. while the exercises are taking place on the combat field.

As explained previously, all of the components described above may be integrated in or adapted to a standardized module in or on the weapon. Equally, it is possible to arrange some of the abovementioned components on portable items of equipment that the shooter has with him, for example uniform, rucksack, helmet etc.

To illustrate an extremely simple embodiment for creating a combat training system, reference is herewith made to FIG. 1, in which the essential components are illustrated in a block diagram. Sensors 1, preferably integrated in the firearm, serve to sense events, position and alignment and to sense the orientation of the firearm in order to be able to detect the firing and determine the direction in which the round was shot. The sensor signals generated with the aid of the sensors undergo a subsequent data preparation 2, in which the sensor signals are prepared for transmission to an external information processing unit 3 and are provided with a coded time signal that individualises the respective firearm. The sensors 1 together with the data preparation 2 form the sensor arrangement 4, which is either integrated in or on a firearm modularly as a structural unit or may be mounted directly on the weapon and attached to items of the shooter's equipment in the form of a distributed system with intercommunicating components, for example using realtime-capable short-range wireless communication.

Alternatively to or in combination with a sensor arrangement 4 mounted directly on the firearm, it is a reasonable development to install the sensor arrangement in the surrounding area, that is as at least one of a terrestrial, water, and airborne remote control system. At least one of the following systems is well suited for this purpose: radar system, optical image and pattern detection system, ultrasound wave based, range-resolving detection system (Sodar), and lightwave-based range-resolving detection system (Lidar).

Markers that can be mounted on the firearm are useful for improving the detectability of the at least one firearm for one of the remote control systems listed above, so that their position as well as a spatial orientation can be detected unerringly. In this case too, each event at a firearm and a target object is captured with resolution as to time, on the basis of a common system time.

Figure 2:
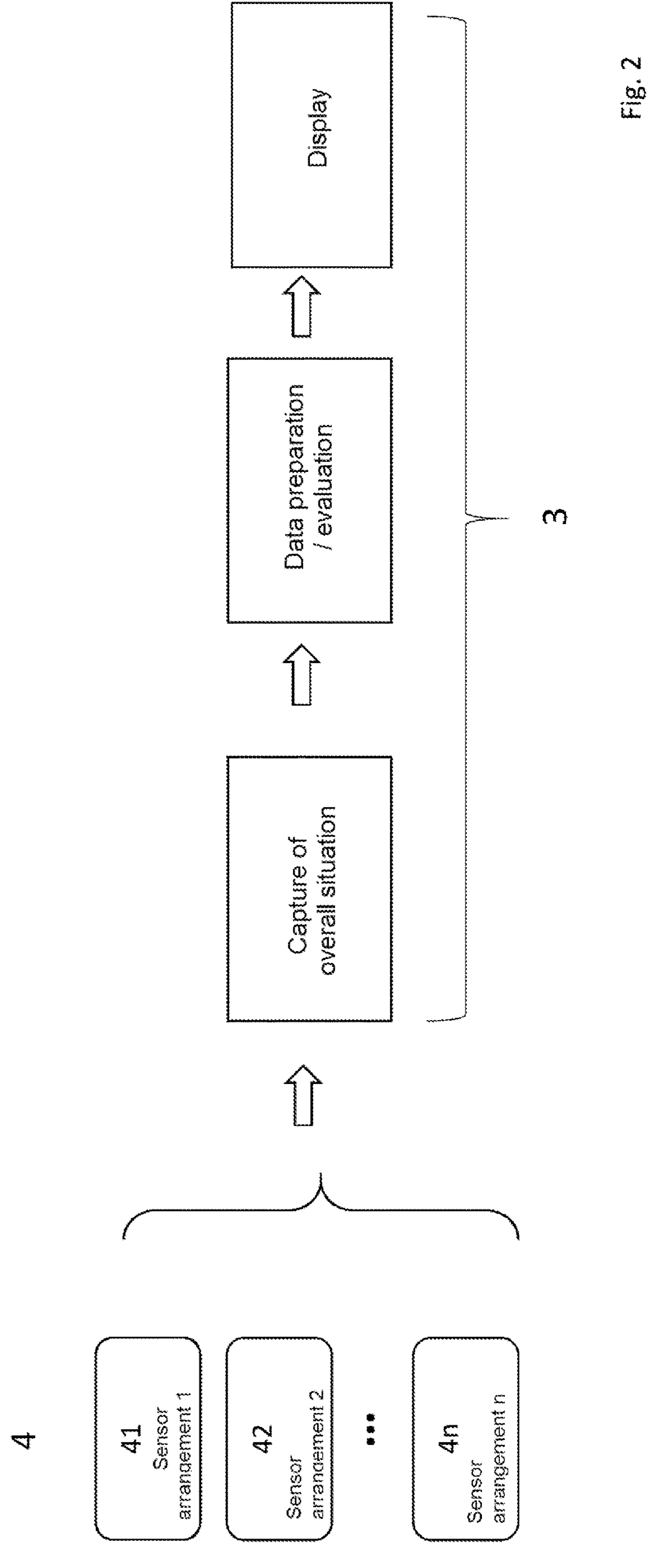
FIG. 2 shows a component arrangement for sensing and displaying the overall situation of a combat scenarios.

FIG. 2 illustrates a scenario which represents n firearms or shooters with firearms. Each individual firearm is equipped with a sensor arrangement $\mathbf{4}_1$, $\mathbf{4}_2$, . . . $\mathbf{4}_n$. The items of event, position and orientation information captured by each of the n sensor arrangements 4 are transmitted, resolved by time, to the central information processing unit 3, where an overall situation picture of the current combat situation is captured, prepared in a data preparation process, and presented in a display. In this context, all firearm-specific events, location and orientation information is merged, wherein the absolute positions are combined under realtime conditions to in at least one of a unified coordinate system for evaluation and display purposes. The capability of sensing and representing the alignment of all firearms in realtime as well as their positions, for example on a monitor or with the aid of a light projection system, introduces considerable added value for firing safety in the conduct of the exercise.

The information processing unit is also equipped with a communications unit, via which detailed feedback based on the data preparation and evaluation performed can be transmitted to all participating shooters, which has the effect of significantly improving the quality of the training.

In addition to the weapon-mounted sensor arrangement for sensing position and spatial orientation, the at least one firearm provides a unit for detecting the arm state and generating information about the arm state of the firearm. The information about the arm state is transmitted to the central information processing unit 3 via a communications unit on the weapon, and is evaluated and displayed together with the respective positions and orientations of the firearms.

Besides the above, the knowledge of the positions, orientations and the arm state of all the firearms involved in a firing exercise makes it possible to connect danger zones within a combat scenario with the positions of the training participants who are bearing firearms and coordinate and show them in realtime. In this way, it is possible to check at any time during an exercise which exercise participants are located in a danger zone (internal firing safety) or are moving beyond zone and area boundaries (external firing safety). This in turn makes it possible to respond quickly and flexibly to firing safety events, e.g., by interrupting the exercise, by informing the firing safety officers, or by a direct message, e.g., via at least one of a participant-specific signalling device and an generalized, broadcast announcement to the entire firing range. In this case, evaluation and decision making may be carried out manually, e.g., by a firing safety officer, or semi-automatically, based for example on a software-supported suggestion for action, or fully automatically. Additionally, sensing of the weapon orientation enables all danger zones to be managed dynamically, for example by adjusting the length of the danger zone according to the elevation of a firearm.

Figure 3:
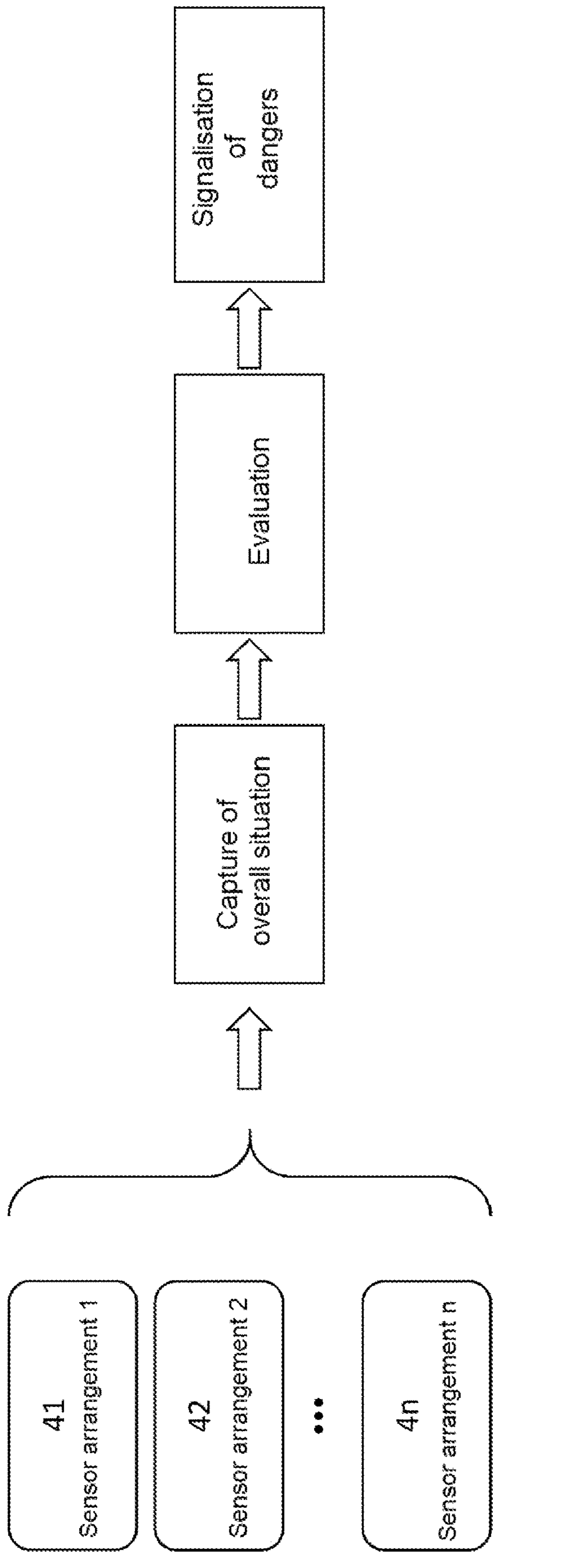
FIG. 3 shows the component arrangement for sensing and displaying according to FIG. 2 and with flexible danger zones.

FIG. 3 shows such an operational scenario, in which n-firearms are each equipped with a sensor arrangement $\mathbf{4}_1$, $\mathbf{4}_2$, . . . $\mathbf{4}_n$. Similarly to the case shown in FIG. 2, the position and orientation of the firearm in space as well as the arm state thereof are used to capture the overall situation of a firing exercise in progress. In conjunction with the danger zones defined from ZDV A2 2090, threats may be converted into signals by data analysis, which signals may be transmitted in a manner perceptible by all participants in the exercise via suitable display and notification means.

Figure 4:
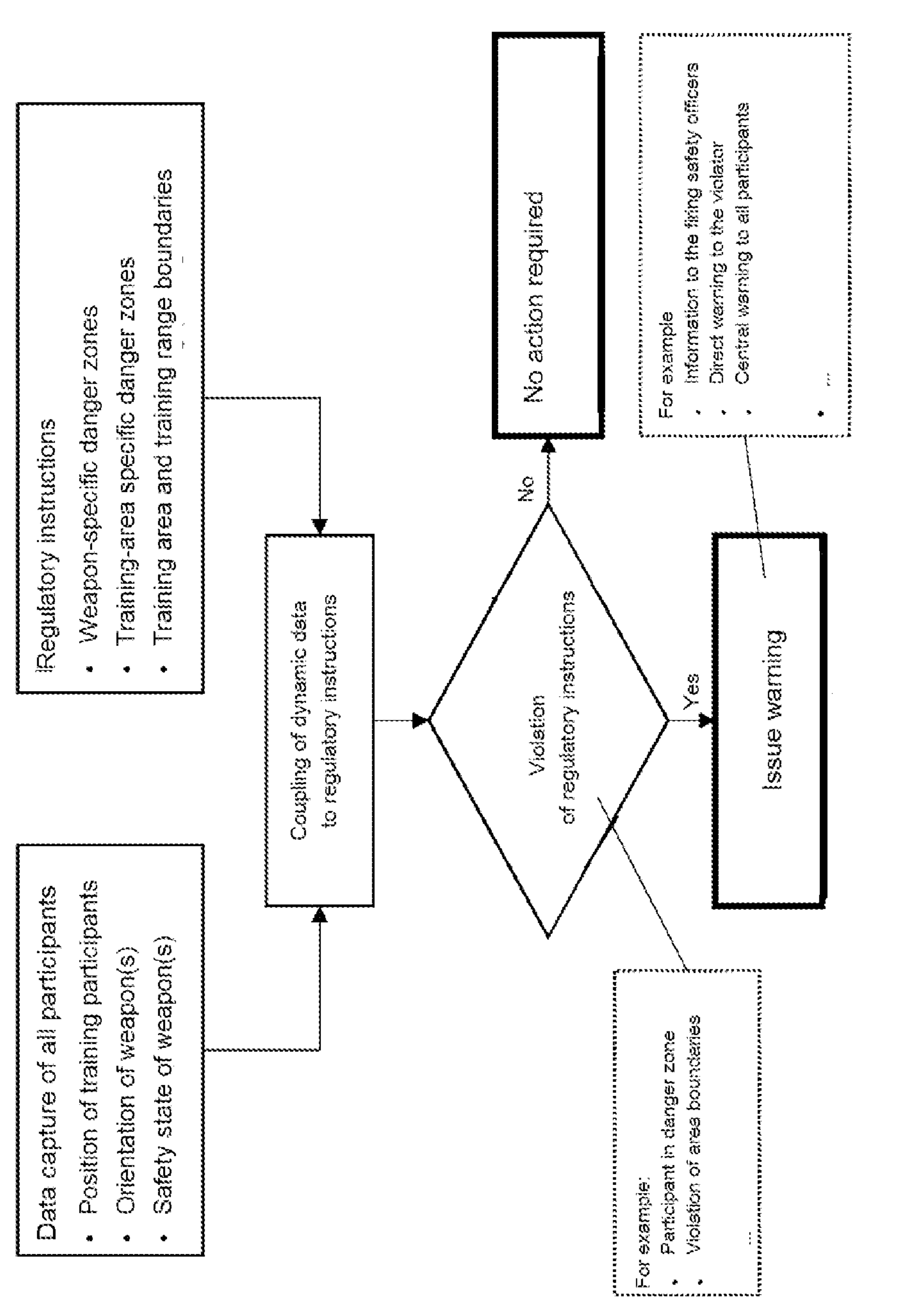
FIG. 4 is a block diagram to illustrate flexible danger zones.

In this context, FIG. 4 shows a block diagram illustrating flexible danger zones, for each of which different decision situations are obtained.

Figure 5:
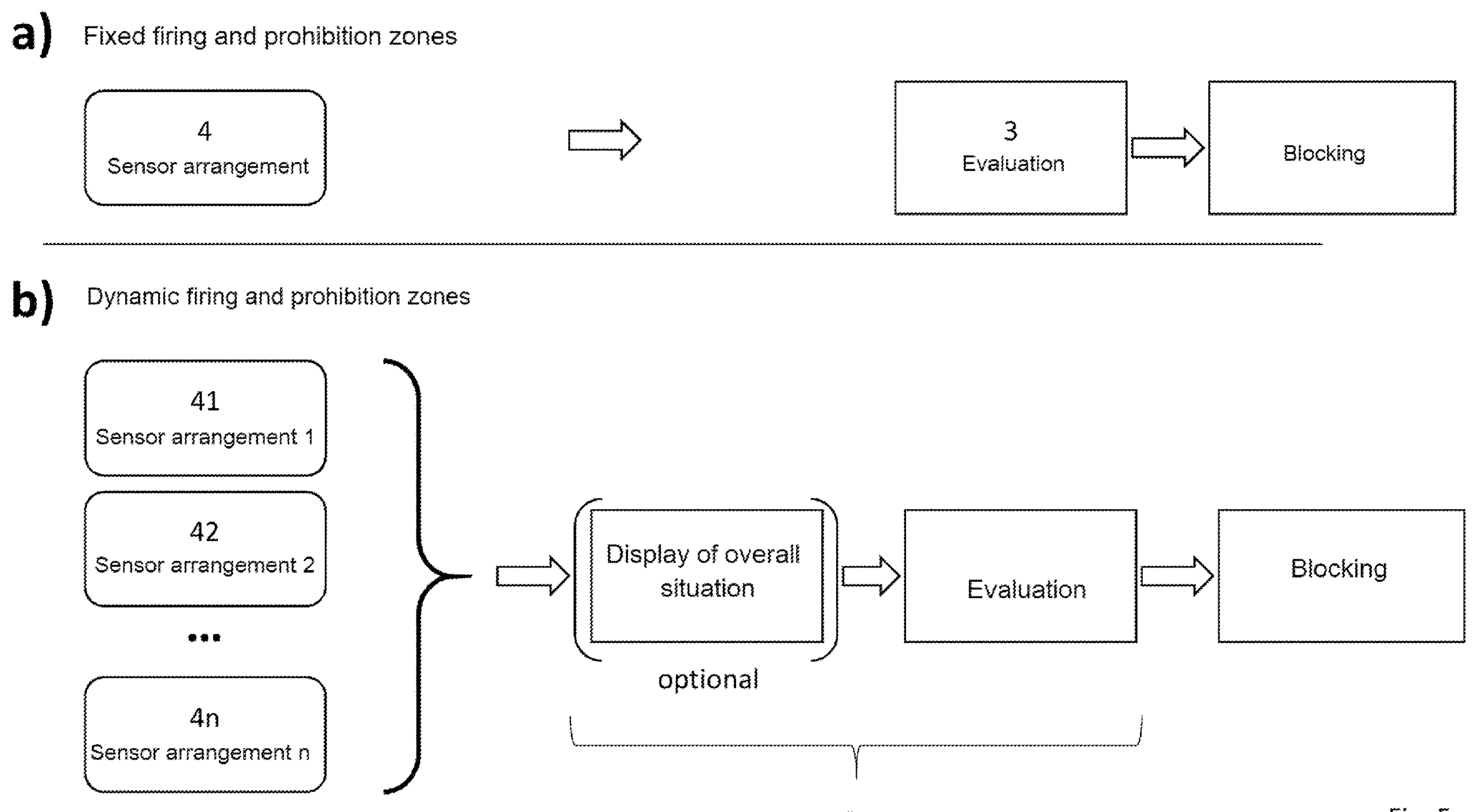
FIG. 5 shows components for sensing and displaying according to FIG. 2 with the option of active weapon deactivation.

In a further preferred embodiment, in addition to the sensor arrangements $\mathbf{4}_1$, $\mathbf{4}_2$, . . . $\mathbf{4}_n$ described previously, the firearms also provide remote controlled weapons blocking capability, which can prevent a weapon from firing, see FIGS. 5 and 6. Such a blocking capability may be activated either if fixed boundaries defined in the sensor evaluation electronics unit before the firearm was used are exceeded (particularly advantageous when used on fixed position shooting facilities and temporary firing ranges) or as a result of evaluation of danger zones and position data.

The following two configuration principles are conceivable for the technical arranged of an activatable firearm disabling device:

1. firing is blocked in the normal state and becomes active, is enabled for example by a command.
2. firing is possible in the normal state and becomes active, which is disabled for example by a command.

The establishment of shooting and prohibition zones is of particular advantage when the combat training system according to the invention is used on facilities with fixed firing positions. Restricting shooting areas has the effect of significantly reducing not only danger to individuals, e.g. from ricochets, but also damage to local infrastructure.

The use of dynamic shooting and prohibition zones is advisable for combat exercises as well as for other reasons. In this context, if a danger is detected for persons who are positioned within the danger zone of a weapon for example, the weapon is blocked and its firing capability is disabled. The assessment as to whether safety zones were violated at a given time is carried out for all exercise participants centrally in the higher-level information processing unit. In this case, any firearm blocking is also controlled and initiated centrally by the information processing unit. Alternatively a firearm block may also be effected in a decentralized way by a local comparison of positions and danger zones. In this case, the firearms exchange information among themselves in realtime via a firearms-specific communication unit. A combination of the two preceding control options is also conceivable depending on the nature of the danger.

FIG. 5*a* illustrates the preceding scenario for fixed position firing and prohibition zones. In this case, a sensor arrangement 4 senses the position, alignment and arm state of the firearm. All this information is forwarded to the central information processing unit 3, where the information is evaluated and a firearm block is initiated according to the case.

FIG. 5*b* illustrates a case scenario for dynamic firing and prohibition zones. In this case, n firearms are present in a training area. The sensor arrangements $\mathbf{4}_1$, $\mathbf{4}_2$, . . . , of the individual firearms calculate the position, the attitude of the firearm and also the arm state of the respective firearm. All information captured is transmitted to the central information processing unit 3, where optionally the overall situation may be displayed, but all information is evaluated taking into account the corresponding danger zones, on the basis of which a block is initiated according to the case. Blocking is carried out firearm-specifically, depending on which of the firearms defines a prohibited danger zone.

Figure 6:
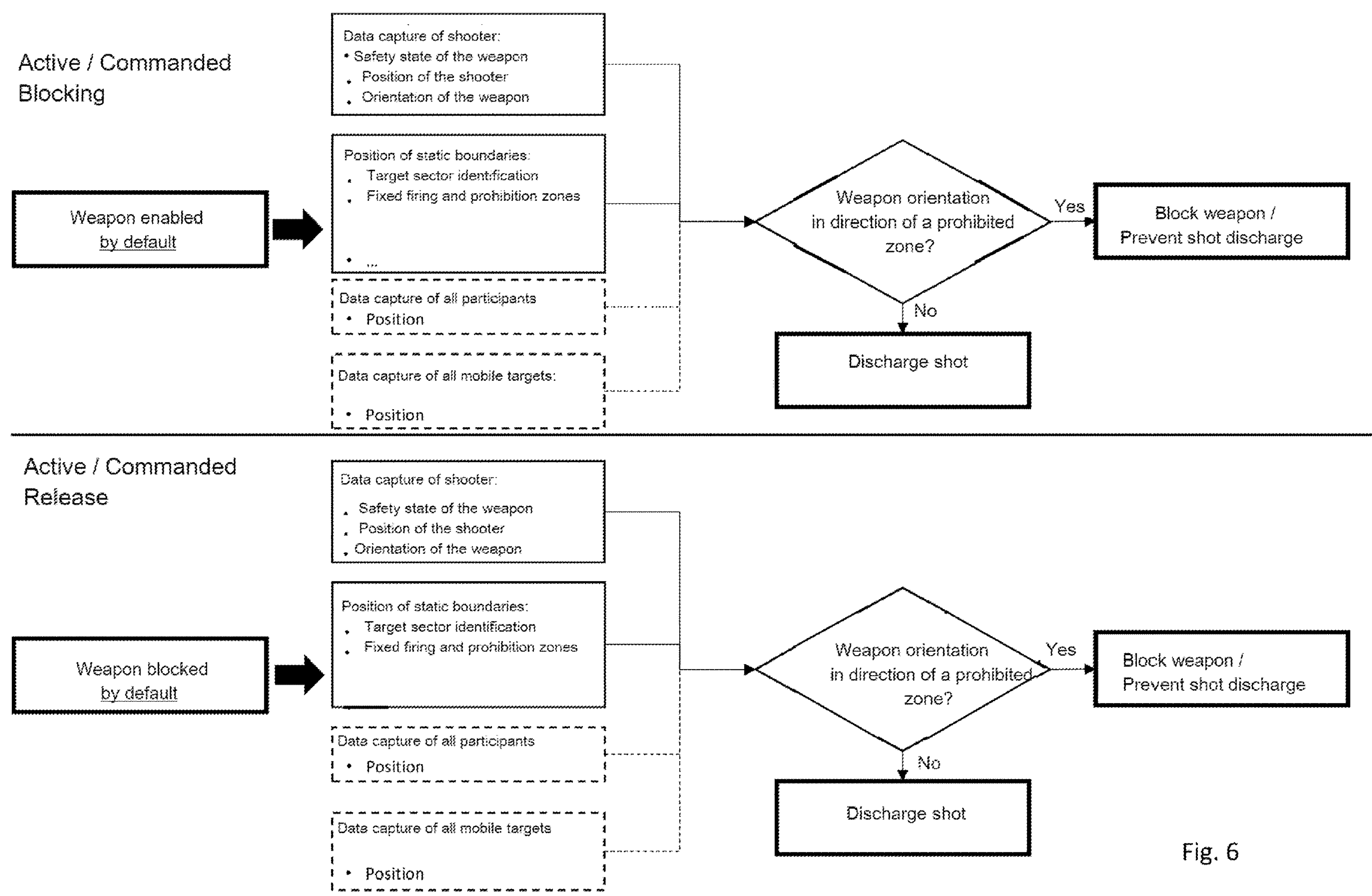
FIG. 6 is a block diagram illustrating integrated weapon deactivation.

In this context, FIG. 6 shows a block diagram illustrating the interaction between firearm blocking in different case constellations.

As for all the embodiments described previously for conducting combat training, the target objects at which the shooters aim their firearms provide a unit for capturing impact events and the position, or advantageously also for capturing the spatial alignment, particularly in cases where the target objects are mobile. In this way, the status of the target object in a permitted impact area and the spatial orientation of the target object may be captured and transmitted to the central information processing unit as an element of target object information.

Figure 7:
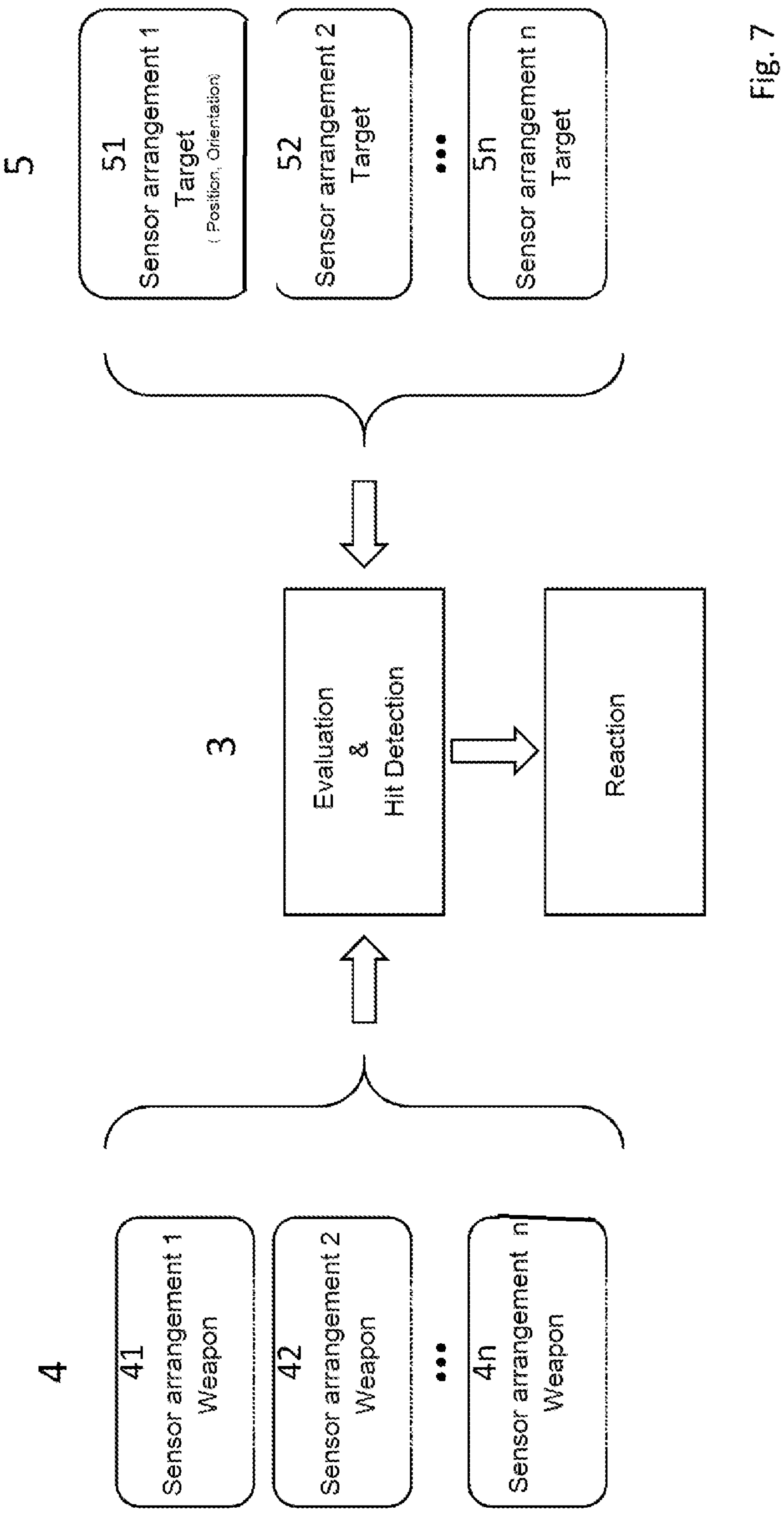
FIG. 7 is a component representation similar to FIG. 2 with sensing and displaying simulated hits
Figure 8:
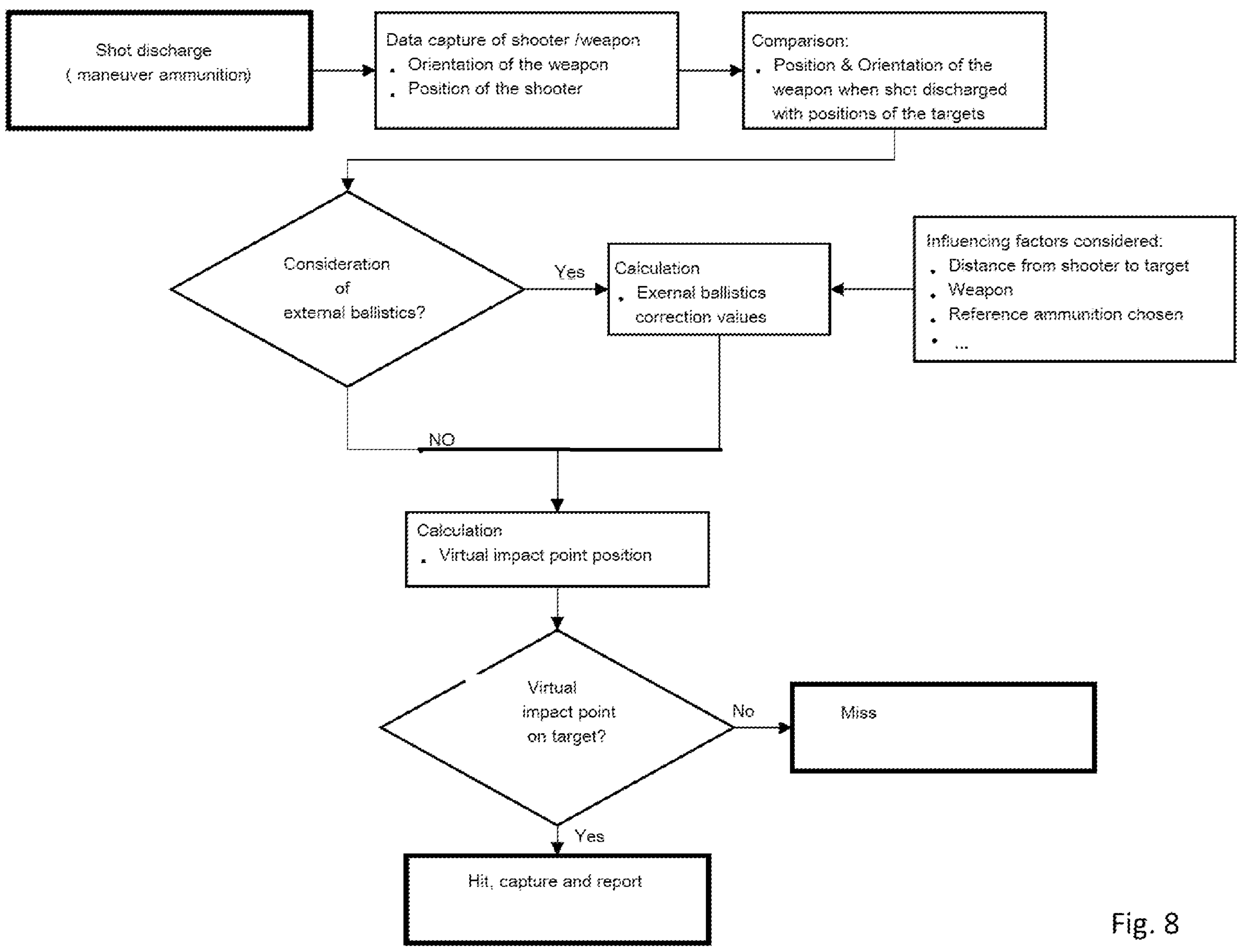
FIG. 8 is a block diagram for sensing simulated hits.

In this regard, FIGS. 7 and 8 show a use case in which simulated hits on the target object can be sensed, that is the firing exercise is conducted with maneuver ammunition, i.e. blanks. All weapons involved in the training are equipped with a sensor arrangement $\mathbf{4}_1$, $\mathbf{4}_2$, . . . , $\mathbf{4}_n$. As in all the use cases described previously, position and alignment sensing of each individual firearm takes place time-synchronously.

In the case of mobile target objects, the target objects are also equipped with a sensor arrangement $\mathbf{5}_1$, $\mathbf{5}_2$, . . . , $\mathbf{5}_n$ for sensing at least the position, preferably also the orientation of each, and these are also time-synchronized with all sensor arrangements involved in the exercise.

Each firearm and each target object involved in the exercise is equipped with a sensor arrangement 4, 5, all of which have a common, precisely synchronized time basis and are also capable of generating a unique identification feature for identifying the respective component, which feature is transmitted to the central information processing unit 3 via a transmitting unit attached to each firearm/target object. At the moment of firing, the position and alignment of a firearm and a target object to be hits are captured by the respective sensor arrangement.

In the same way as the sensor arrangement 4 in the n firearms for sensing the position, alignment and also the firing event, the target objects are also fitted with a sensor arrangement 5, which is able to sense the position and optionally also the alignment of the target object, and a unit for sensing an event at the target object, for example an impact event, and transmit to the central information processing unit. All sensor arrangements 4, 5 are time-synchronized with each other, and are also able to transmit an identification feature to the information processing unit for purposes of unique component identification.

At the time a shot is fired, the point in time, the position and orientation of the respective firearm and also the target object at which the firearm was aimed is captured. From the captured information and its temporal correlation, the central information processing unit calculates whether the target object was hit. Optionally, a ballistics model of the shot motion may be taken into account as well as a temporal correlation criterion for the evaluation of the information and the associated determination of the shooter-target assignment. The corresponding target object may optionally also respond correspondingly upon determination of a hit, controlled by the central information processing unit, for example by tipping of a falling plate target on the target object.

Various interference parameters, such as virtual weather conditions or a modified external ballistics behaviour of virtual projectiles may also be taken into account when assessing hits. It is also possible to incorporate 3D terrain data in the hit assessment, for example concealment of a target object by buildings or land topologies.

Figure 9:
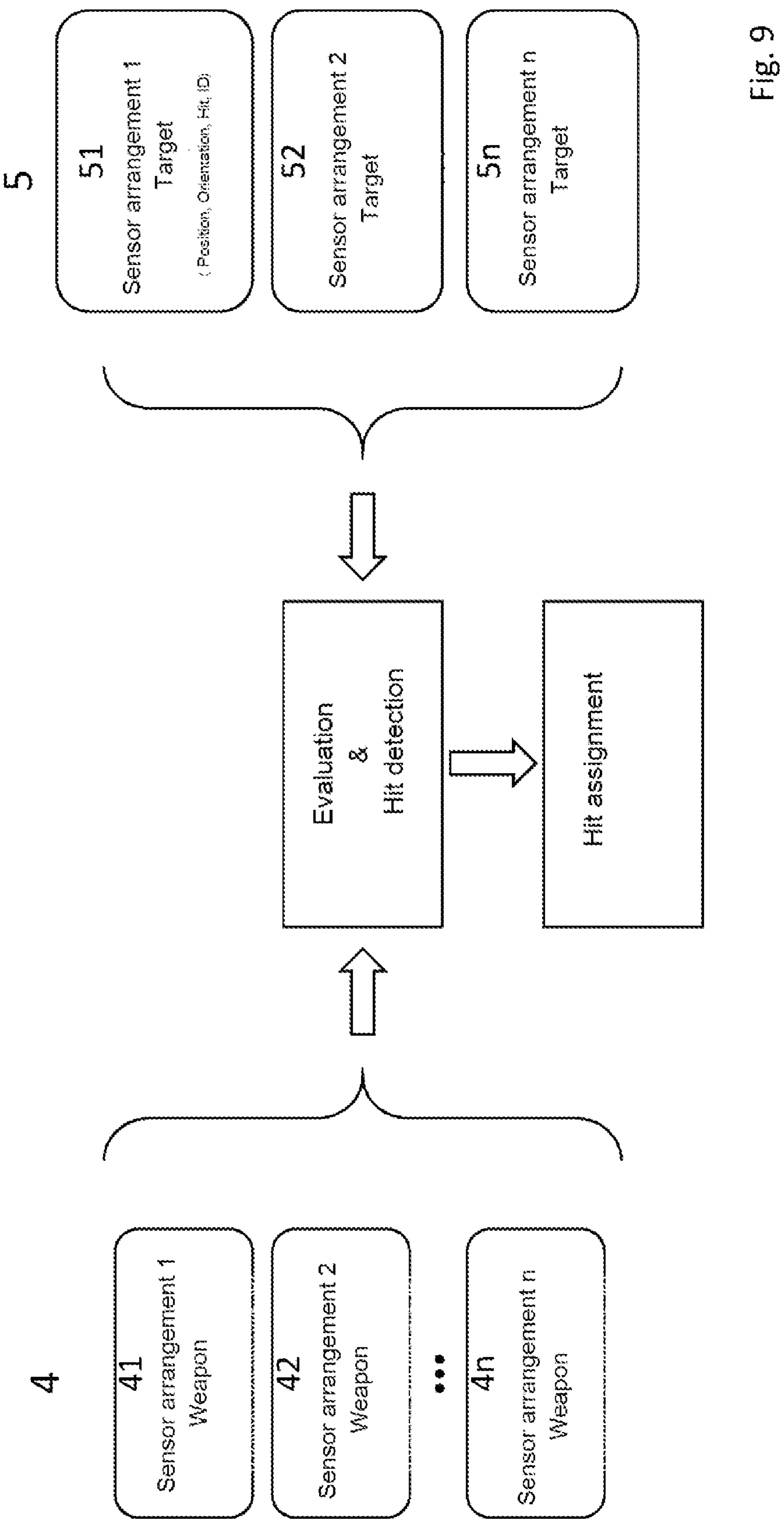
FIG. 9 shows a component arrangement for sensing and analysing according to FIG. 1 with weapon-specific hit assignment.
Figure 10:
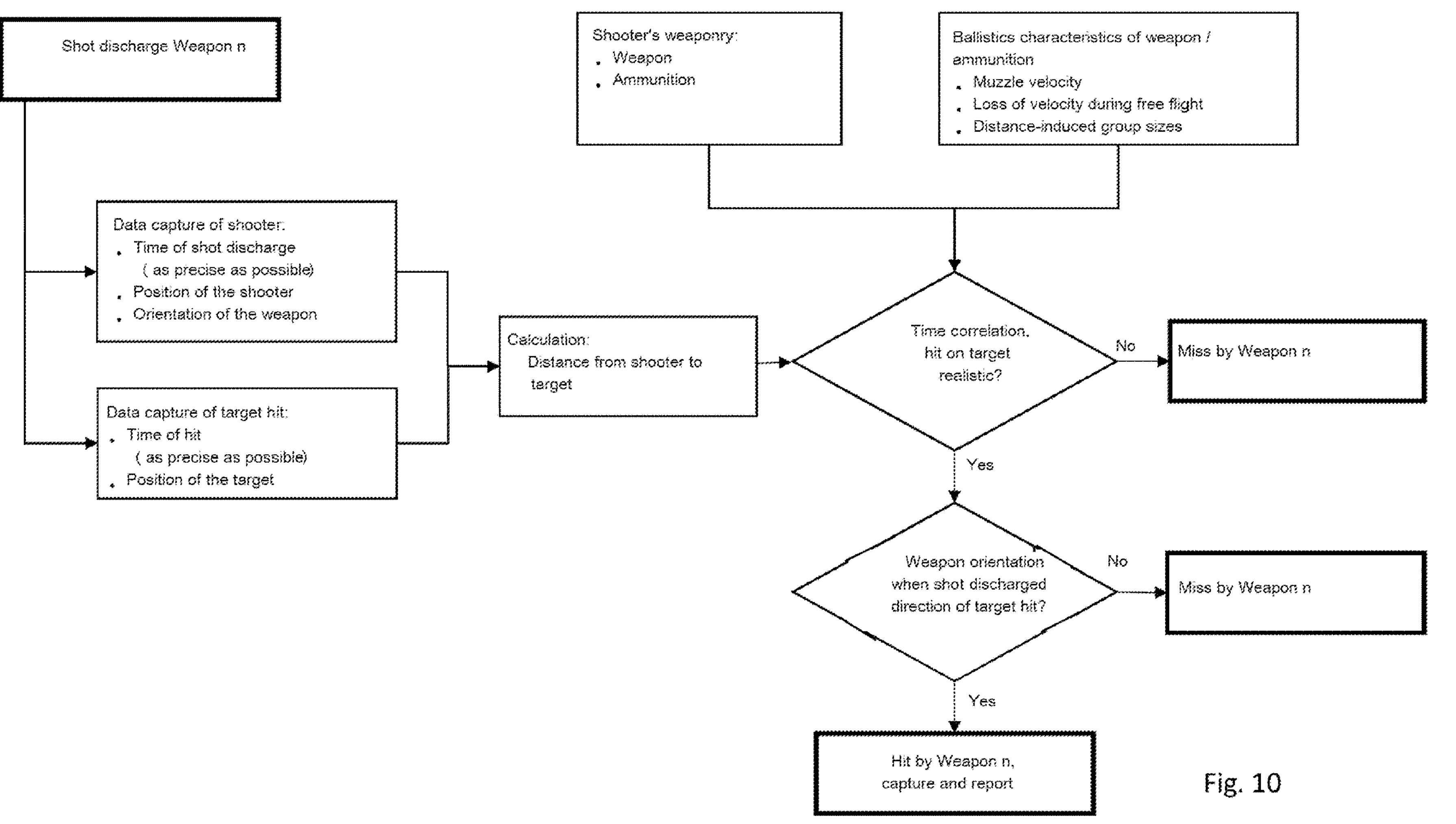
FIG. 10 is a block diagram to illustrate weapon- and shooter-specific hit assignments.

In a further application case, illustrated in FIGS. 9 and 10, the firearms are each equipped with the sensor arrangement $\mathbf{4}_1, \mathbf{4}_2, \ldots, \mathbf{4}_n$, which, besides determining the position and alignment of the firearm, is also able to capture the time of a discharge with sufficient accuracy, preferably in the millisecond range. The target objects to be combated are also equipped with a sensor arrangement $\mathbf{5}_1, \mathbf{5}_2, \ldots, \mathbf{5}_n$, which enables sensing of the position and optionally of the alignment of the respective target object, and is able to detect a precisely temporally resolved impact event, and transmits this additionally to the central information processing unit together with a corresponding timestamp as hit information. Each component in the exercise, which is equipped with sensor arrangements 4, 5 also works with a time basis which is sufficiently exactly time-synchronized with the other components, and a unique identification feature, so that temporal and positional events, i.e. firings and hits on the target object can be captured in correlated manner. This correlation may incorporate models, e.g. an external ballistic description of the projectile trajectory, for example so that flight times and shot distances derived therefrom can be considered.

The sufficiently precise time of a discharge is sensed on the firearm, in the same way the sufficiently precise time of a hit is sensed on the target object. Based on these values, taking into account the alignment of the firearm and target object relative to each other, the distance between the weapon and the target and the external ballistic properties of the ammunition used, it can be determined which firearm with the greatest probability hit the corresponding target object. The unique identification feature enables a weapon-specific hit assignment, which may be evaluated while the exercise is ongoing or subsequently.

Figure 11:
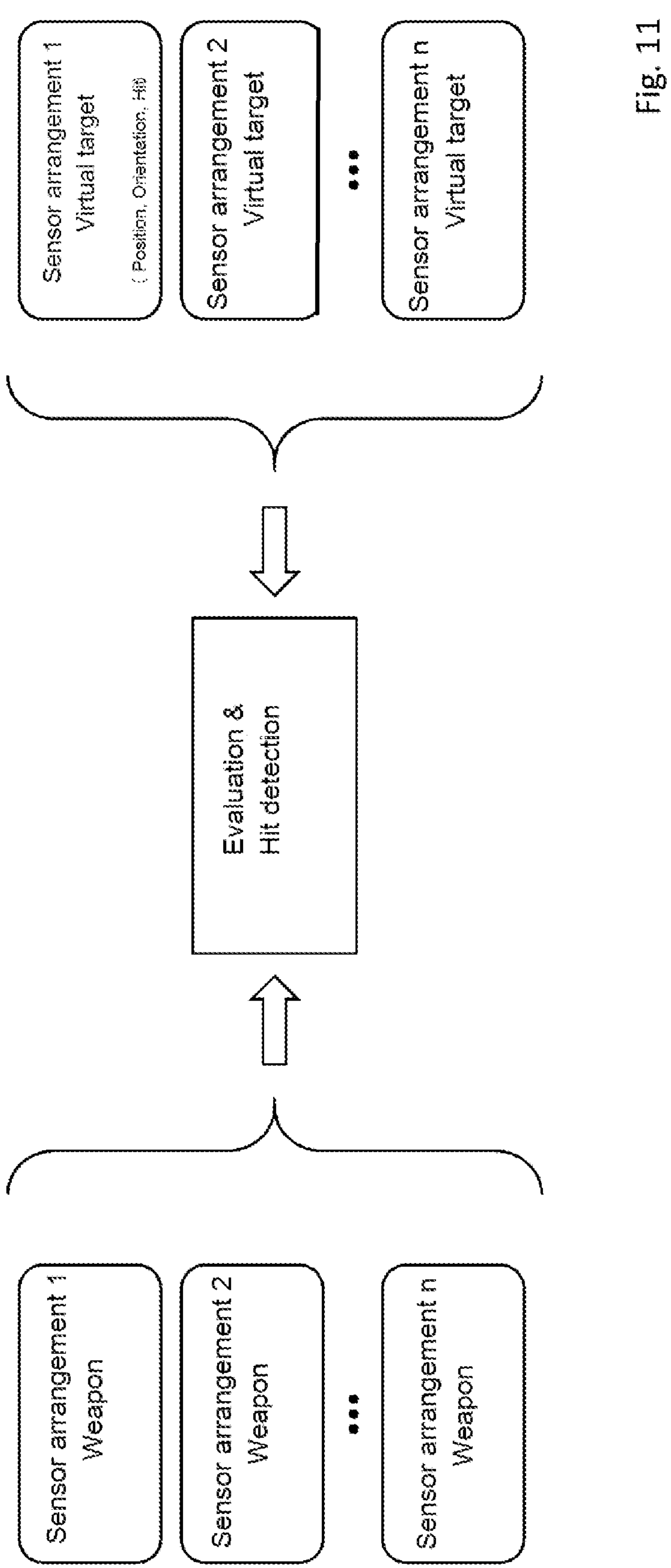
FIG. 11 is a component representation according to FIG. 6 with generation of virtual target objects.
Figure 12:
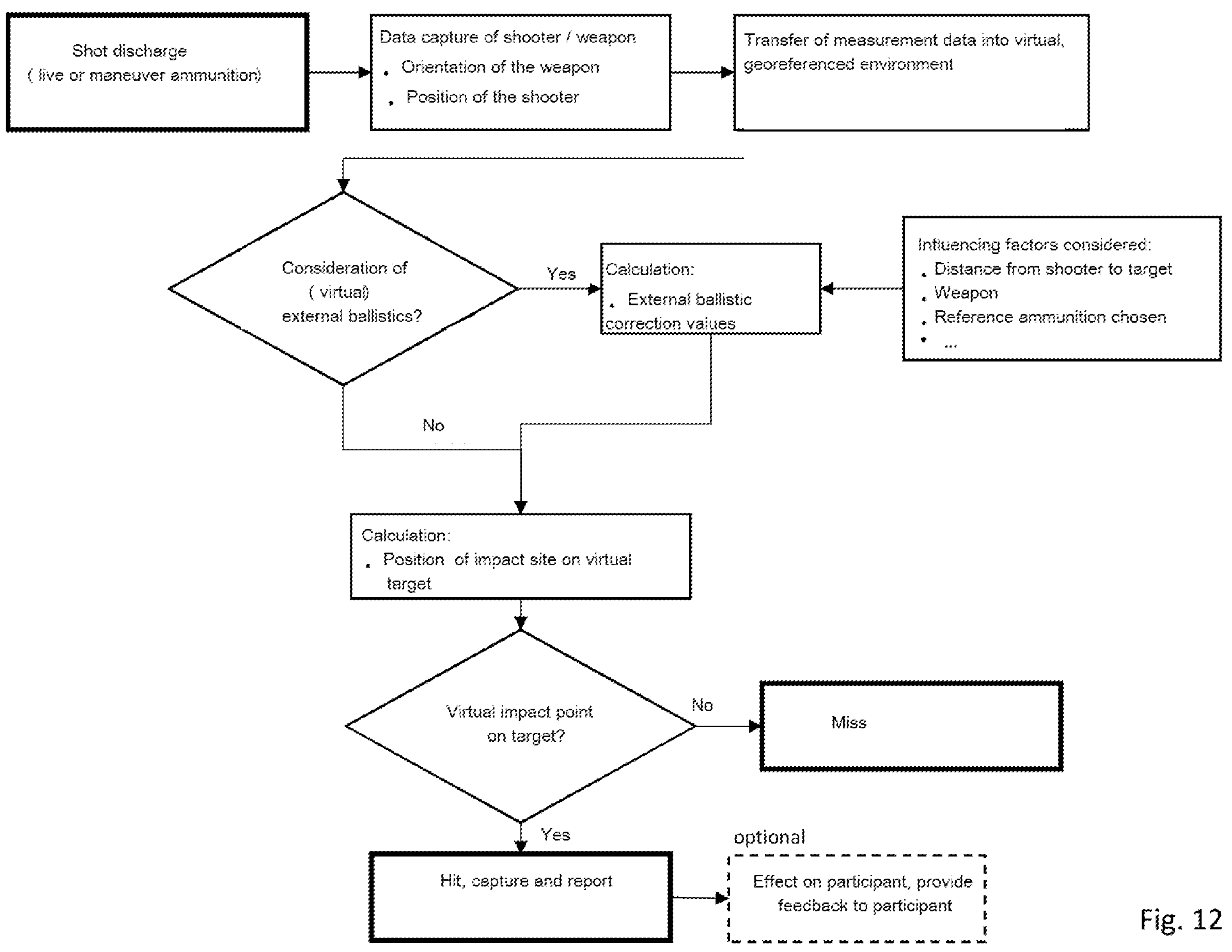
FIG. 12 is a block diagram for combating virtual targets.

In a further use case, illustrated in FIGS. 11 and 12, the positions, orientations and the times of discharge of the respectively participating firearms are captured. If virtual targets, are introduced with georeferencing into the training scenario, for example through the use of an Augmented Reality System, for example using VR glasses worn by the individual shooters, these can be combated with the real firearms equipped with the sensor arrangement. In such cases, it is of no importance whether maneuver or life ammunition is being used. Hits on virtual target objects of such kid can be calculated on the basis of the position and orientation of the firearms and the virtual position of the target. At the same time, however, it is important for example the ensure by using a dynamic, situation-dependent weapons blocking system, that no unacceptable dangers are caused, by overelevation of weapons for example.

LIST OF REFERENCE NUMERALS

1 Sensors
2 Data preparation
3 Information processing unit
$\mathbf{4}_1, \mathbf{4}_2, \ldots, \mathbf{4}_n$ Sensor arrangement on firearm
$\mathbf{5}_1, \mathbf{5}_2, \ldots, \mathbf{5}_n$ Sensor arrangement on target object

The invention claimed is:

1. A system for monitoring and managing shooting practice and combat practice involving firearms from which projectiles or shots are fired toward the target objects in which the firearms and target objects operate in a unified time system and a unified coordinate system during the shooting practice and combat practice comprising:

sensors individually associated with the firearms and the target objects for sensing a position of each of the firearms and each of the target objects operating in the unified time system and the unified coordinate system during the shooting practice or combat practice;

clocks, individually associated with each of the firearms and each of the target objects, which are synchronized and generate time stamps and position information in the unified coordinate system of the firearms and the target objects while operating in the unified coordinate system during which shots or projectiles are fired from at least the firearms and impacting the target objects;

event sensors, individually associated with the firearms and the target objects, which sense and time stamp when a firearm fires a shot or projectile toward one of the target objects and when the target object is impacted by the fired shot or projectile; and a processor for processing the sensed time stamps for each of the firearms and the target objects operating in the unified time system which uniquely identifies the position of the firearms and target objects in the unified coordinate system when the events are time stamped involving the firearms firing the shots and projectiles toward the target objects in the unified time system in the unified coordinate system and the processor processes the time stamps of the sensed events and provides monitoring of the shooting practice and the combat practice and supervising the shooting practice and the combat practice; and wherein the event sensors comprise at least one of an accelerometer, an acoustic sensor, a sound sensor, a deformation sensor, and a contact sensor individually associated with the firearms and individually associated with targe object.

2. A combat training system according to claim 1, wherein:

the event sensors for sensing the position information are part of the firearms.

3. A combat training system according to claim 2, wherein:

the event sensors sense spatial orientation information of the firearms which are part of each of firearms involving the shooting practice and the combat practice.

4. A combat training system according to claim 2, wherein:

the firearms include a firearm disabling system which is remotely controlled by the processor.

5. A combat training system according to claim 2, wherein:

the event sensors sense the position of the events and receive and evaluate terrestrial position or satellite generated position signals of the firearms and the target objects.

6. A combat training system according to claim 5, wherein:

the sensors orientate at least one of terrestrial, waterborne and an airborne remote control system.

7. A combat training system according to claim 5, wherein:

the event sensors sense spatial orientation information of the firearms and are part of firearms.

8. A combat training system according to claim 7, wherein:

the sensors include at least one of an inertial measurement unit, a magnetometer, a camera, an optical sensor, an ultrasonic transducer, a motion sensor, or a uwb location system.

9. A combat training system according to claim 1, wherein:

the event sensors sense spatial orientation information of the firearms and are part of the firearms involving the shooting practice and the combat practice.

10. A combat training system according to claim 1, wherein:

the sensors are at least one of terrestrial, waterborne and airborne remote control system.

11. A combat training system according to claim 10, wherein:

the sensors are in at least one of a radar system, an optical image and a pattern detection system, an ultrasound wave system, a range-resolving detection system (SODAR), a lightwave-based range-resolving detection system (LIDAR), and a motion capture system.

12. A combat training system according to claim 1, wherein:

the sensors each comprise at least one of an information transmitter and an information receiver.

13. A combat training system according to claim 1, wherein:

the firearms detect armed states of the firearms and generate information regarding the armed states of the firearms.

14. A combat training system according to claim 1, wherein:

the firearms include a firearm disabling system which is remotely controlled by the processor.

15. A combat training system according to claim 1, wherein:

event sensors generate time-coded signals produced by one of the clocks.

16. A combat training system according to claim 1, comprising:

an optical projection system for generating the target objects virtually.

17. A combat training system according to claim 16, wherein:

the optical projection system comprises at least one of virtual reality glasses and a spatially positionable projection surface.

18. A combat training system according to claim 1, wherein:

the processor comprises at least one of a receiver for receiving position and orientation information of each firearm;

a calculator for processing and evaluating the at least received position and orientation information of each firearm;

the clocks are generated by the processor; and a display for displaying result information of the shooting practice and the combat practice and further comprising a transmitting unit for transmitting information used for shooting practice and the combat practice.

19. A combat training system according to claim 8, wherein:

the clocks are associated with the processor.

* * * * *